United States Patent [19]

Sumiyoshi et al.

[11] 4,031,553

[45] June 21, 1977

[54] IMPLOSION-RESISTANT CATHODE RAY TUBE WITH PROTECTIVE ASSEMBLY FOR ITS FACE PLATE

[75] Inventors: Hiroji Sumiyoshi, Sagamihara; Tomosuke Chiba, Matsudo, both of Japan

[73] Assignee: Sony Corporation, Tokyo, Japan

[22] Filed: Nov. 25, 1975

[21] Appl. No.: 635,240

[30] Foreign Application Priority Data

Dec. 17, 1974 Japan ...................... 49-152750[U]

[52] U.S. Cl. ................................ 358/247; 358/246

[51] Int. Cl.² ........................................ H04N 5/65

[58] Field of Search ............... 178/7.82; 220/2.1 A, 220/2.3 A; 313/478, 479

[56] References Cited

UNITED STATES PATENTS

| | | | |
|---|---|---|---|
| 3,760,215 | 9/1973 | Sach | 178/7.82 |
| 3,952,152 | 4/1976 | Lill | 178/7.82 |

*Primary Examiner*—Howard W. Britton

*Attorney, Agent, or Firm*—Lewis H. Eslinger; Alvin Sinderbrand

[57] ABSTRACT

A cathode ray tube having a metal reinforcing band girdling its envelope adjacent the face plate is provided with a transparent protective panel which covers the face plate and is affixed to the latter by a transparent conductive layer of an adhesive resin filling a space therebetween, and one or more conductive connecting elements providing an electrically conductive connection between the transparent conductive layer and the reinforcing band which is grounded. The transparent panel and the transparent conductive layer cooperate to protect the face plate from damage that might cause implosion of the tube envelope, and the connection of the transparent conductive layer to ground ensures that the protective panel will not be electrified, whereby to eliminate any shock hazard from contact therewith.

6 Claims, 7 Drawing Figures

IMPLOSION-RESISTANT CATHODE RAY TUBE WITH PROTECTIVE ASSEMBLY FOR ITS FACE PLATE

BACKGROUND OF THE INVENTION

1. Field of the Invention

This invention relates generally to cathode ray tubes, and more particularly is directed to improvements in such cathode ray tubes for reducing the risk of implosion thereof and electrical hazards.

2. Description of the Prior Art

In order to reduce the risk of implosion of the envelope of a cathode ray tube which is usually made of glass, various arrangements are employed for reinforcing the glass envelope, particularly at the face plate thereof. In one of the existing arrangements for reinforcing the glass envelope, a protective panel of a transparent plastic or safety glass covers the face plate and is bonded or fixed to the latter by means of a transparent adhesive resin, such as, a polyester resin, epoxy resin or the like, which is injected into a gap or space between the outer surface of the face plate and the protective panel. However, when such a reinforced or implosion-resistant cathode ray tube is used in a television receiver or the like, there is still the danger or hazard of electrical shock if a viewer contacts the exposed surface of the protective panel at a time when the cathode ray tube is in operation and for a period of time following such operation.

Such electrical shock hazard results from the fact that, during operation of the cathode ray tube, a high voltage of the order of 10 to 30 KV is applied, as an anode voltage, to a conductive coating on the inner surface of the glass envelope. Such high voltage applied at the inside of the envelope causes an electrical charge to be developed on the outer surface of the envelope and such electric charge does not disappear during the period of operation of the cathode ray tube, as well as for a short time immediately after the operation of the cathode ray tube is discontinued. Therefore, if a viewer touches the outer surface of the face plate or of the previously mentioned protective panel which is usually exposed, there is the possibility of such person being subjected to an electrical shock. Since the degree or strength of the electrical shock thus received and its effect on the person being subjected thereof may vary from one individual to the next on the basis of the physical characteristics of such individual, and further may vary in accordance with the temperature and humidity of the environment in which the cathode ray tube is located, it cannot be stated categorically that the electrification of the outer surface of the envelope is dangerous in all cases. However, there is no question that the electric shock that may be received as a result of such electrification is, in any event, a source of considerable discomfort to any adult subjected thereto. Further, the electric shock is dangerous or harmful if received by a young child or by an adjult having a physical condition that makes such person particularly susceptible to damage from electrical shocks. As previously indicated, the electrical shock hazard is not eliminated by the provision of a protective panel disposed in front of the face plate of the tube envelope, as in an implosion-resistant cathode ray tube, as the electrical charge which creates the shock hazard may also be developed on the outer surface of the protective panel.

OBJECTS AND SUMMARY OF THE INVENTION

Accordingly, it is an object of this invention to provide an implosion-resistant cathode ray tube which is also free of the described electrical shock hazard, at least in respect to any portion of the cathode ray tube which is normally exposed in use.

Another object is to provide a cathode ray tube with a protective assembly for its face plate so as to reduce the risk of implosion of the tube envelope, and which further prevents the build-up of electrical charges on the exposed surface of such protective assembly so as to eliminate the described shock hazard.

A further object is to provide a cathode ray tube in which a transparent protective panel covers the face plate of the tube envelope and is bonded thereto by a transparent adhesive layer therebetween for reducing the risk of implosion of the tube envelope, and in which the buildup of electrical charges on the exposed surface of the protective panel is prevented for eliminating the previously mentioned electrical shock hazard.

In accordance with an aspect of this invention, in an implosion-resistant cathode ray tube, as aforesaid, the transparent adhesive layer which bonds the transparent protective panel to the face plate for reducing the risk of implosion of the tube envelope is formed of a conductive material, and one or more conductive connecting elements are provided to form an electrically conductive connection between the transparent, conductive adhesive layer and ground, whereby to prevent the build-up of electrical charges on the exposed outer surface of the protective panel.

In the case where the cathode ray tube is provided with the usual metal reinforcing band girdling its envelope adjacent the face plate, and which is conveniently connected to ground, it is a feature of this invention to place each conductive connecting element in electrically conductive engagement with such reinforcing band. Further, when a flexible insulating tape is wound about the edge of the protective panel and extends from the latter to at least the face plate portion of the tube envelope for closing the periphery of the space between the protective panel and face plate and thereby preventing leakage of the transparent, conductive adhesive from such space, each conductive connecting element preferably includes a first portion which extends at the outside of the flexible tape and between the latter and the reinforcing band, and a second portion extending at an angle to the first portion and having a pointed contact piece for piercing the flexible tape and extending into the transparent conductive adhesive between the protective panel and the face plate.

The above, and other objects, features and advantages of the invention, will be apparent from the following description of illustrative embodiments which is to be read in conjunction with the accompanying drawings.

DESCRIPTION OF THE PREFERRED EMBODIMENTS

Figure 1:
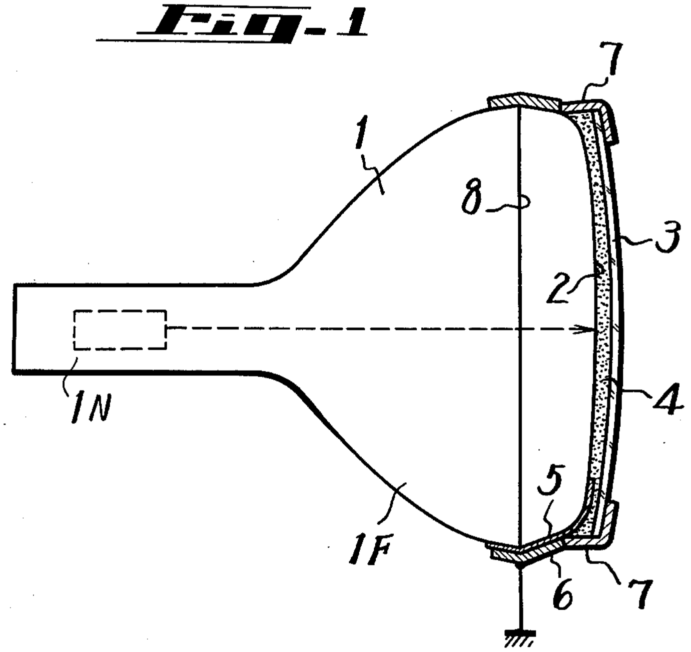
FIG. 1 is a side elevational view of an implosion-resistant cathode ray tube according to an embodiment of this invention, and in which the protective assembly for the face plate of the tube is shown in section.

Referring initially to FIG. 1, it will be seen that an implosion-resistant cathode ray tube of the type to which the present invention is applied may comprise a tube envelope 1 having the usual neck portion 1N from which a funnel-shaped or flaring portion 1F extends, and a face plate 2 which is joined, at its periphery, to the edge or widest part of flaring portion 1F at a mold-line or seam 8 therebetween. A transparent protective panel 3 of safety glass or suitably rigid plastic resin is disposed in front of face plate 2 so as to cover the latter, and a gap or space between protective panel 3 and face plate 2 is filled with a layer or body 4 of transparent adhesive resin by which protective panel 3 is secured to face plate 2. Further, the cathode ray tube is shown to be provided with a metal reinforcing band 6 which girdles or encircles envelope 1 adjacent face plate 2 and particularly at the region of weld-line or seam 8. It will be apparent that the protective panel 3 and the adhesive layer 4 bonding the same to face plate 2 cooperate to protect the face plate from impacts that might cause implosion of the tube envelope.

In accordance with the present invention, in the cathode ray tube as described above, the transparent adhesive resin making up the layer or body 4 has an electrically conductive material dispersed therein to such an extent as to substantially reduce its electrical resistance without adversely affecting the transparency of the layer 4, and the resulting conductive transparent layer 4 is connected to ground. Thus, any electric charge that might appear on the front surface of protective panel 3 by reason of electrification of the outer surface of face plate 2 is effectively transferred or drained off to ground through the grounded conductive layer 4. Accordingly, with the cathode ray tube according to this invention, a viewer may come in contact with protective panel 3 without the risk of receiving an electric shock therefrom.

In the embodiment of the invention illustrated on FIG. 1, the connection of the conductive transparent layer 4 to ground is effected by means of at least one length or strip of metal tape 5, for example, of aluminum, which is bonded to a peripheral portion of face plate 2 so that one end portion of metal tape 5 will extend into the gap or space between face plate 2 and protective panel 3 which is eventually filled with the conductive transparent adhesive resin 4, while the other end portion of tape 5 extends over weld-line or seam 8 so as to lie inside of metal reinforcing band 6 and make electrical contact with the latter when the metal band 6 is applied to the tube. Further, the reinforcing metal band 6 is conveniently connected to ground, as shown, with the result that the connection of the conductive transparent layer 4 to ground is effected through metal tape or strip 5 and metal reinforcing band 6.

However, in producing a cathode ray tube with a protective panel 3 fixed to its face plate 2 by the transparent adhesive layer 4, a flexible insulating tape 7 is usually wound about the edge of protective panel 3 and extends from the latter over the periphery of face plate 2 beyond mold-line or seam 8 for closing the periphery of the space or gap between panel 3 and face plate 2 and thereby preventing leakage of the conductive, transparent adhesive resin 4 from such space or gap. It will be apparent that insulating tape 7, as thus applied, would cover the metal tape or strip 5, and thus would prevent the electrical contact of metal tape 5 with the girdling reinforcing band 6. Accordingly, before applying the reinforcing band 6 to the tube envelope 1, the portion of insulating tape 7 which extends over mold-line or seam 8 must be peeled off or removed so as to expose at least a portion of metal tape or strip 5 for electrical contact with the metal reinforcing band 6 applied thereover. It will be realized that the peeling or removing of a portion of insulating tape 7 for exposing the underlying metal tape or strip 5 is a troublesome operation in producing a cathode ray tube according to the embodiment of this invention shown on FIG. 1.

Figure 2:
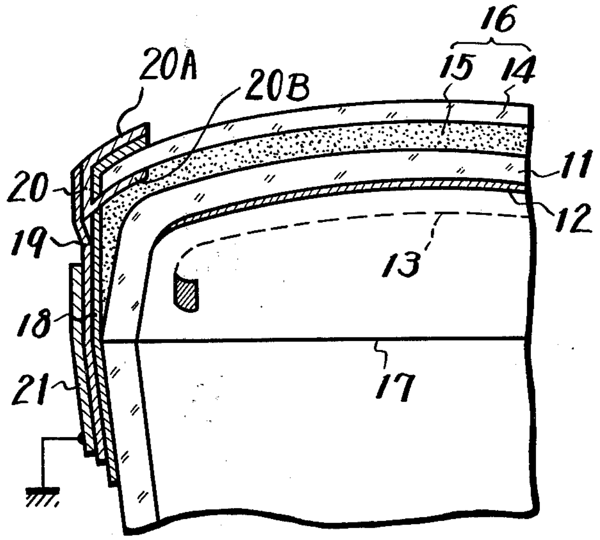
FIG. 2 is an enlarged, fragmentary sectional view of a portion of an implosion-resistant cathode ray tube according to another embodiment of the invention.

Referring now to FIG. 2, it will be seen that, in another embodiment of this invention which avoids the above described problem associated with the production of the cathode ray tube shown on FIG. 1, an implosion-resistant cathode ray tube again includes a tube envelope having a face plate 11 which, on its inner surface, is coated with a phosphor screen 12, and an electrode 13 located within the tube envelope adjacent to phosphor screen 12 for determining the landing positions of electron beams on such phosphor screen. Once again, a transparent protective panel 14, for example, of safety glass, is located in front of face plate 11 so as to cover the latter, and a transparent, conductive adhesive resin is injected into the space or gap between protective panel 14 and face plate 11 so as to form a transparent, conductive layer 15 which bonds or fixes panel 14 to the face plate, and which, with panel 14, forms an implosion-resistant or protective assembly 16 for the face plate. As in the previously described embodiment, a flexible insulating tape 18, for example, a polyester tape with a thickness of about 0.05mm., is wound about the edge of protective panel 14 and extends from the latter over the periphery of face plate 11 so as to cover the mold-line or seam 17 between the face plate and the remainder of the tube envelope, whereby to close the periphery of the space between panel 14 and face plate 11 and prevent leakage of the conductive adhesive resin during the injection of the latter into such space.

However, in the embodiment of FIG. 2, the portion of flexible insulating tape 18 extending over mold-line 17 remains in place when the usual metal reinforcing band 21 is applied to the tube envelope so as to girdle the latter at the location of the mold-line 17. In order to permit the foregoing, the conductive connection between transparent, conductive layer 15 and metal band 21 which is suitably connected to ground is effected by means of one or more conductive connecting elements 20. As shown, each of the conductive connecting elements 20 is formed of one or more suitable metals and comprises a first band-like portion 19 and a second portion extending from the band-like portion 19 at an angle to the latter and including a pointed contact piece 20B which is adapted to pierce the flexible insulating tape 18 and thus extend into the gap between face plate 11 and protective panel 14 for electrically conductive contact with the transparent, conductive layer 15 in such gap. As shown particularly on FIG. 3, each conductive connecting element 20 may further include a finger-like member 20A which is spaced from and substantially parallel with contact piece 20B so as to cooperate with the latter in defining a generally U-shaped clip which grips the peripheral portion of protective panel 14 when contact piece 20B pieces insulating tape 18 and extends into contact with transparent, conductive layer 15. It will be understood that each conductive connecting element 20 is installed as shown on FIG. 2 after the adhesive resin has been injected into the gap between face plate 11 and protective panel 14 so that the band-like portion 19 of each connecting element 20 then extends over insulating tape 18 beyond mold-line 17. Thus, when reinforcing metal band 21 is applied to the tube, the band-like portion 19 of each connecting element 20 extends between insulating tape 18 and metal band 21 so as to be in intimate or electrically conductive contact with the latter.

Figure 3:
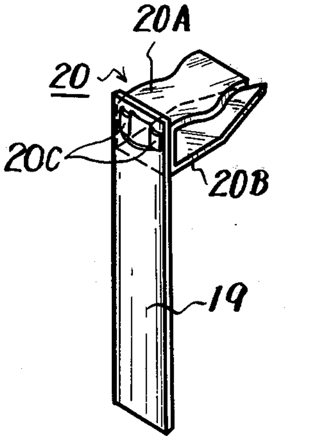
FIG. 3 is a perspective view of a conductive connecting element that may be employed in the implosion-resistant cathode ray tube of FIG. 2.

The above described portions of each connecting element 20 can be formed integrally with each other or, as shown on FIG. 3, the generally U-shaped clip defined by finger-like member 20A and pointed contact piece 20B may be formed of a spring or resilient conductive metal to exert a gripping action on the periphery of protective panel 14, while the band-like portion 19 of the connecting element is formed of a relatively flexible conductive metal so as to conform readily to the contours at the inner surface of reinforcing band 21 when the latter is tightened about the tube envelope. Moreover, as shown on FIG. 3, the U-shaped clip defined by finger-like member 20A and contact piece 20B may have tabs 20C struck from its bight portion and adapted to be upset after engagement in a hole at the adjacent end of band-like portion 19 for securing together the several portions of element 20.

Figure 4A:
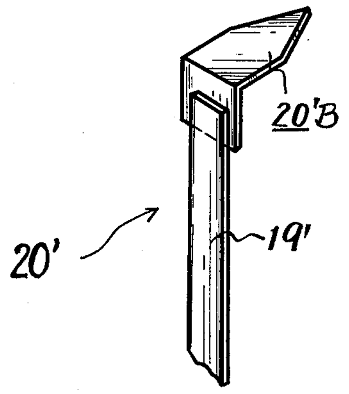
FIGS. 4A and 4B are views similar to that of FIG. 3, but showing respective modified conductive connecting elements that may be used in cathode ray tubes according to this invention.
Figure 4B:
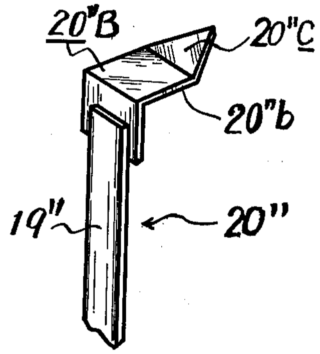

Referring now to FIG. 4A, it will be seen that a conductive connecting element 20' that may be used in place of the connecting element 20 of FIGS. 2 and 3 again includes a band-like portion 19' and a generally L-shaped connecting piece 20'B having one of its arms welded or otherwise secured to one end of band-like portion 19', while the other arm of the L-shaped contact piece 20'B is pointed for piercing the flexible insulating tape 18, as previously described. In the connecting element 20', the pointed arm of L-shaped contact piece 20'B may, as shown, enclose an obtuse angle with band-like portion 19'. In the further modified connecting element 20'' shown on FIG. 4B, the contact piece 20''B which is secured to an end portion of band-like portion 19'' includes an arm **20''*b* which extends substantially at right angles to the band-like portion 19'' and has a further angled pointed end 20''*c***.

Figure 5:
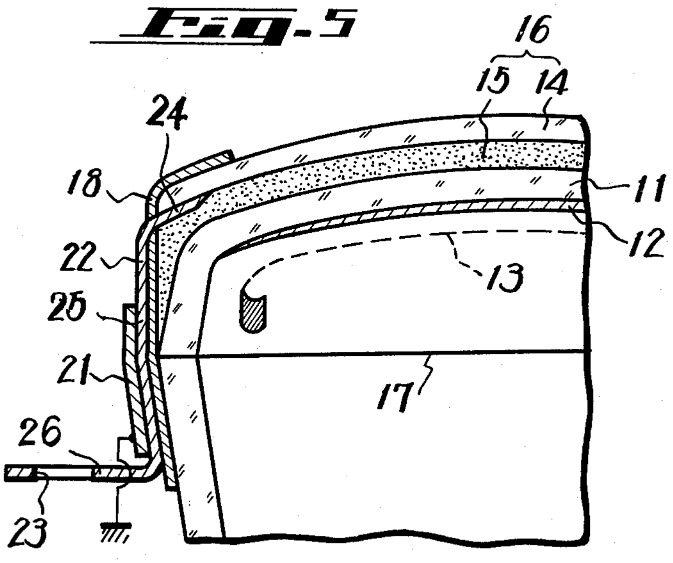
FIG. 5 is a view similar to that of FIG. 2, but showing another embodiment of an implosion-resistant cathode ray tube according to the invention.
Figure 6:
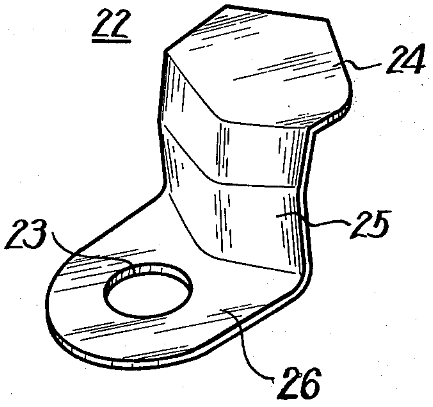
FIG. 6 is a perspective view of a conductive connecting element included in the protective assembly of the cathode ray tube shown on FIG. 5.

Referring now to FIGS. 5 and 6, in which the parts of the cathode ray tube corresponding to those described above with reference to FIG. 2 are identified by the same reference numerals, it will be seen that each conductive connecting element 22 provided for electrically connecting the transparent, conductive layer 15 with the metal reinforcing band 21 is of one-piece or integral construction and is of generally Z-shaped configuration. More specifically, each connecting element 22 is shown to include a pointed contact piece or end portion 24 extending inwardly at a substantial angle from a middle or body portion 25, and an outwardly directly opposite end portion 26 having a bore or opening 23 therein. When installing each connecting element 22, the pointed contact piece 24 at one end is made to pierce the flexible insulating tape 18 so as to contact the transparent, conductive layer 15 between face plate 11 and protective panel 14 while the middle or body portion 25 extends rearwardly over the insulating tape 18. After such installation of connecting element 22, the usual metal reinforcing band 21 is extended around the tube envelope so as to engage and be in electrical contact with the body or middle portion 25 of each connecting element 22, while the end portion 26 of the latter extends outwardly in back of band 21. Preferably, a number of the connecting elements 22 are applied to the cathode tube, for example, at the corners of face plate 11 in the case where the latter is of substantially rectangular configuration, so that the bores or holes 23 of the connecting elements 22 may receive bolts, not shown, for mounting the cathode ray tube on a chassis or the like. When the connecting elements 22 are to perform the dual functions of establishing an electrical connection between conductive layer 15 and the grounded reinforcing band 21 and of mounting the cathode ray tube on a chassis or the like, it is preferred that the reinforcing band 21 be welded to the middle portions 25 of connecting elements 22.

In all of the above described embodiments of the invention, the adhesive resin which is used to form the transparent, conductive layer 4 or 15 is preferably a non-saturated polyester resin in which a metallic soap is dispersed or added so as to provide the adhesive resin with a resistance value of $10^6$ to $10^8 \Omega$cm.

By way of example, a suitable conductive adhesive resin for use in a cathode ray tube according to this invention may have the following composition, in which the parts given are by weight:

Non-saturated polyester resin-100 parts
Fatty acid potassium — 0.2 to 1 parts
Water — 0.2 to 1 parts
Triethyleneglycol — 0.6 to 3 parts
Methylethylketoneperoxide (hardening catalyst) — 0.1 to 1 parts In the above composition, the fatty acid potassium maybe lauric acid potassium, oleic acid potassium or stearic acid potassium.

Another example of a conductive adhesive resin that may be used in accordance with this invention is a non-saturated polyster resin to which there is added approximately 1 to 2%, by weight, of a heavy metallic soap, for example, mainly composed of potassic soap, along with suitably minor amounts of a metal chelate such as, ethylene diamine tetraacetate-disodium and an anionic surfactant.

It will be apparent that, in all of the described embodiments of the invention, the protective assembly consisting of the protective panel 3 or 14 and the transparent, conductive layer 4 or 15 provided in front of the face plate 2 or 11 of the tube envelope serves to protect such face plate from impacts so that an implosion accident of the cathode ray tube is prevented. Further, since the transparent, conductive layer 4 or 15 is grounded, any electrical charge that might build-up on the outer surface of the protective panel 3 or 14, either during use of the cathode ray tube or immediately thereafter, is discharged to ground so that there is no danger of being subjected to an electrical shock by contact with the protective panel. It is also to be noted that the grounded layer 4 or 15 cannot be touched by a user as such layer lies in back of the protective panel 3 or 14.

It is further to be noted that, in the embodiments of the invention illustrated on FIGS. 2–6, that is, in those embodiments where each connecting element 20,20′,20″ or 22 is formed to pierce the flexible insulating tape 18 for electrical contact with the transparent, conductive layer 15, each such connecting element can be applied over the insulating tape 18 and is then electrically contacted by the reinforcing metal band 21 without the need to peel or remove any portion of the insulating tape 18, whereby to simplify the assembling of the cathode ray tube. Furthermore, when the contact piece 20B of the connecting element 20 has a finger-like member 20A associated therewith to form a clip which engages over the periphery of protective panel 14, as on FIGS. 2 and 3, such clip stabilizes the position of the respective connecting element 20 so that the latter will be properly located for engagement with the metal reinforcing band 21 when the latter is installed.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cathode ray tube comprising an envelope having a face plate, a conductive reinforcing band girdling said envelope adjacent said face plate, a transparent protective panel covering the outer surface of said face plate and being spaced from the latter, a transparent conductive adhesive resin filling the space between said face plate and said panel to cooperate with the latter in protecting said face plate and adhesively joining said panel to said face plate, and at least one conductive connecting element providing an electrically conductive connection between said conductive material and said band.

2. A cathode ray tube according to claim 1; in which said connecting element includes a first portion engaged with said band and a second portion extending from said first portion at an angle to the latter and projecting into said space for conductive contact with said resin therein.

3. A cathode ray tube according to claim 2; further comprising a flexible insulating tape wound about the edge of said panel and extending from the latter to at least said face plate for closing the periphery of said space between said panel and face plate and thereby preventing leakage of said adhesive resin from said space.

4. A cathode ray tube according to claim 3; in which said flexible tape extends between said band and the adjacent surface of said envelope, said first portion of the connecting element is interposed between said band and said flexible tape, and said second portion of the connecting element includes a pointed contact piece for piercing said flexible tape and extending into the resin in said space.

5. A cathode ray tube according to claim 4; in which said second portion of the connecting element further includes a finger-like member spaced from said contact piece in substantially parallel relation to the latter and cooperating with the contact piece to define a clip which grips the peripheral portion of said panel.

6. A cathode ray tube according to claim 4; in which said first portion of the connecting element has said second portion extending from one of its ends and the other end of said first portion has a bore therein for mounting of the cathode ray tube.

* * * * *